Nov. 12, 1968 C. N. FRENCH Re. 26,487
REACTION MECHANISM
Original Filed June 3, 1964
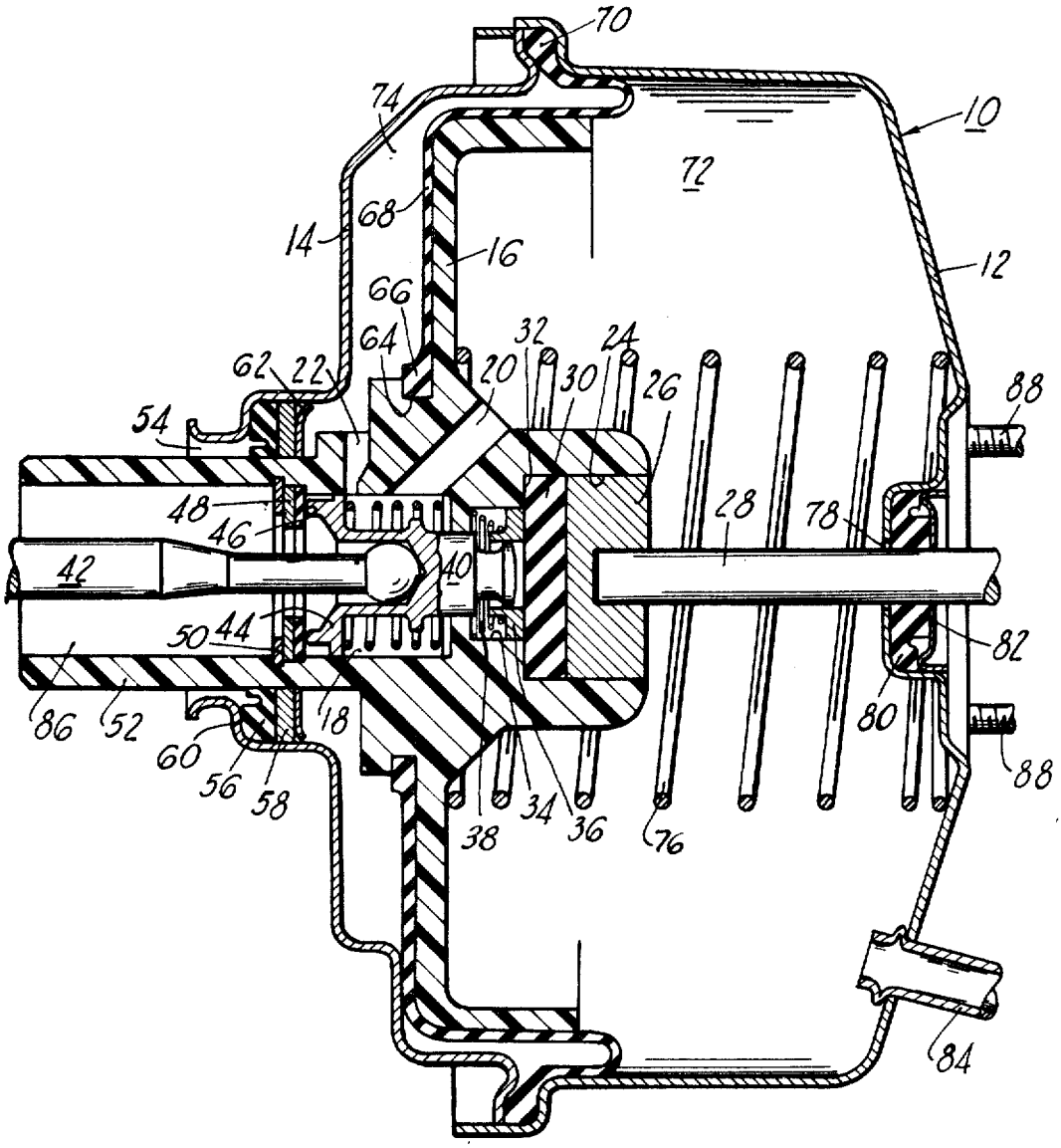
INVENTOR.
CHARLIE N. FRENCH
BY
Richard A. Gilb
ATTORNEY United States Patent Office Re. 26,487
Reissued Nov. 12, 1968

26,487
REACTION MECHANISM

Charlie N. French, South Bend, Ind., assignor to The Bendix Corporation, a corporation of Delaware Original No. 3,279,327, dated Oct. 18, 1966, Ser. No. 372,323, June 3, 1964. Application for reissue Feb. 24, 1967, Ser. No. 626,645
7 Claims. (Cl. 91—369)

Matter enclosed in heavy brackets [ ] appears in the original patent but forms no part of this reissue specification; matter printed in italics indicates the additions made by reissue.

*ABSTRACT OF THE DISCLOSURE*

*A reaction means between an operator-operated valve means and a force transmitting means of a servomotor including a pressure responsive element to proportionally vary the area of a reaction force transmitting device on the operator-operated valve means.*

This invention relates to power brake units for motor vehicles and particularly to brake booster mechanisms incorporating "feel" of application of the brake.

It is desirable in power brake booster mechanisms to provide a structure by which there is an apparent feel of the degree of application of the brakes of the vehicle that the operator may have more accurate control over the brake effort applied to the vehicle, and thereby the rate of deceleration of the vehicle. To accomplish this, it has become the general practice to utilize the hydraulic pressure developed in the master cylinder during a brake application for application to a member that transmits pressure to a manually operated element that is under the control of the operator of the vehicle and feel the pressure developing in the master cylinder and thereby have a sense of feeling of the brake effort applied to the wheels of the vehicle. The amount of "feel" that is transmitted from the master cylinder to the foot of the operator through the reaction system of the power brake unit is only a small portion of the total brake effort applied at the wheels of the vehicle.

Numerous reaction systems have been proposed in the prior art by which the operator of the vehicle is given a sense of feeling the full power of the brake application. Some of these have used hydraulically operated plungers that have their area proportioned to the area of the brake fluid displacement member that operates in the master cylinder so as to provide a proportionate brake "feel" while others have used diaphragms with opposite sides exposed to pressure differentials to obtain the desired brake "feel" and still others have utilized mechanical level components to obtain a proportioned brake "feel" to the foot of the operator of the vehicle.

It is an important object of the present invention to provide a novel type brake booster mechanism wherein a body of deformable material is provided to receive reaction pressure from the master cylinder with the deformation of the body transferring the reaction forces to a manual control member.

Another object of the present invention is to provide clearance in the reaction structure so that the reaction structure would not be forced into the deformable member when the associated control mechanism is actuated to bring an associated servomotor into operation.

Another object of the present invention is the provision of a new and improved reaction structure of the above described type which does not produce a rapid build-up and reactive force upon the control structure of the servomotor.

It is a still further object of this invention to place a deformable member between a force transmitting member and a movable wall within a cavity in said movable wall such that said deformable member may extrude into an opening upon being forced by said force transmitting member, which cavity is provided with a means to vary the area of extrusion in accordance with a pressure exerted on said deformable member by said force transmitting member to automatically vary the proportion of "feel" imparted to an operator of the servomotor.

Further objects and advantages of the present invention will be apparent from the following description of the accompanying drawing in which a servomotor is shown in cross section.

With reference to the drawing, a servomotor construction 10 has been provided which greatly reduces the number of parts that have heretofore been thought necessary within such a servomotor; so that the design is the epitome of simplicity, and has greatly reduced a manufacturing cost of a fluid pressure servomotor. The housing of the servomotor 10 is formed by means of a front and rear shell stampings 12 and 14, respectively, which are assembled according to principles set forth in Patent No. 3,083,698 assigned to the common assignee.

According to further principles of the present invention the power driven element 16 of the servomotor 10 is formed by a single cast or molded part which is so arranged or constructed as to provide the necessary valve chamber 18 and fluid passages 20 and 22 as well as a cavity 24 for the reception of a plunger 26 operatively connected to a force transmitting member 28 and a deformable disk 30 between the plunger 26 and the shoulder 32 of the cavity 24. As may also be seen the cavity 24 is stepped down as at 34 to provide an extrusion cavity in which I have inserted a ring 36 that is biased by means of a heavy spring 38 to abut on the deformable member 30.

The ring 36 is appropriately located to slidably receive a reaction plunger 40 formed on one end of a connecting member for a valve control rod 42. The connecting member is formed at the end opposite that of the reaction plunger into a valve poppet 44 that cooperates with a valve seat 46 held to the one piece plastic movable wall 16 by means of a washer 48 and a retaining member 50. As may be readily observed the retaining member 50 fits within an appropriate groove in a tubular extension 52 of the plastic movable wall 16, which extension is slidably mounted through a rear opening 54 in the rear shell 14, as by means of a seal 56 and bearing 58 held against a shoulder 60 of the opening 54 by means of a spring retainer 62. The one piece plastic movable wall 16 is provided with a groove 64 into which a beaded portion 66 of a diaphragm 68 is snapped into place with the diaphragm 68 having a further beaded peripheral edge 70 held between the juncture of the shells 12 and 14 so that the servomotor 10 is divided into two variable volume chambers 72 and 74. In absence of a pressure differential across the wall 16 and diaphragm 68, a spring 76 positioned between the rear shell 12 and the plastic movable wall 16 holds the wall in the rearmost position shown.

The force transmitting rod projects through the forward shell 12. However, the opening 78 in the forward shell 12 is sealed by means of an annular seal 80 held therein by a spring retainer 82.

The servomotor shown is designed to be operated by a pressure less than atmosphere, which pressure is directed thereto from an engine intake manifold for an associated vehicle (not shown) by means of the proper conduit that is sealingly joined with an inlet 84 in the forward shell 12. However, it is not beyond the skill of the art to utilize a unit such as I have proposed with a system having the power source a fluid pressure greater than atmosphere. It would merely mean that the inlet 84 could be open to atmosphere and an opening 86 in projection 52 could be connected to a high pressure source. For the pressure different than that of the power source being introduced through inlet 84 we have provided the tubular projection 52 of the wall 16 with the central opening 86 to feed atmospheric pressure into the appropriate section of the servomotor 10 upon scheduling theerof by displacement of poppet 44 from the seat 46 described hereinafter in greater detail.

In operation the operator of a vehicle will depress the brake pedal to cause inward movement of the control rod 42 to move the poppet 44 off the valve seat 46, initially with the peripheral edge of the connecting member closing off communication between passages 20 and 22. After the initial movement the poppet 44 is moved to the position whereby the reaction plunger 40 abuts the deformable member 30 and the peripheral sides of the poppet 44 have been placed between the passages 20 and 22 to prevent communication of chamber 72 and 74. At this time the central opening 86 of the tubular projection 52 is open by means of passage 22 to the variable volume chamber 74. Since the pressure in variable volume chamber 72 is less than atmosphere, and since the pressure in the variable volume chamber 74 is atmosphere or greater, as the case may be, depending upon to what the central opening 86 is communicated, the movable wall 16 and diaphragm 68 will tend to compress the spring 76 to drive the force transmitting member 28 outwardly of the shell 12.

Normally, a master cylinder (not shown) is connected to the forward portion or forward shell 12 by means of bolts 88 so that the force transmitting rod will tend to displace a fluid from the master cylinder to associated wheel cylinders (not shown) for a vehicle to apply the vehicle's brakes. As the force in the master cylinder builds up, the movement of the rod 28 is resisted to impart a force in the opposite direction to the deformable member 30. At first the deformable member 30 will extrude through the opening in the ring 36 to abut upon the reaction plunger 40 to tend to drive the control rod 42 in the opposite direction of actuation of the poppet 44, aforementioned.

If, the reaction force on the force tranmsitting member 28 is great enough to overcome the spring 38 it will also tend to drive the ring 36 rearwardly by extruding over the total opening area of the extrusion cavity 34. As seen, the ring 36 is provided with rearwardly facing projections that cooperate with the reaction plunger 40 to direct the extrusion forces on the ring 36 through the reaction plunger 40, thereby increasing the proportion of reaction forces acting on the control rod 42 due to the increased extrusion area.

It will thus be seen that the initial opening of the valve 44 will have little or no resistance; whereas "feel" imparted to the control rod 42 will immediately begin upon a small area of the reaction plunger 40 when the movable wall 16 begins to traverse the servomotor 10 to compress the springs 76. At a predetermined force on rod 28 the area upon which the deformable member 30 operates on the reaction plunger 40 is materially increased to [provided] *provide* an operator of the vehicle with a very high "feel" in that ring 36 moves inwardly of cavity 34.

While the invention has been described in considerable detail, I do not wish to be limited to the particular construction shown and described; and it is my intention to cover hereby all novel adaptations, modifications and arrangements thereof which come within the practice of those skilled in the art to which the invention relates.

I claim:

1. For use with a servomotor mechanism having a power device, means controlling said power device, force transmitting means operatively connected to said power device, said force transmitting means including a confined deformable member arranged for variable extrusion to proportionally vary the reaction on said means controlling said power device upon actuation of said power device, and force responsive means operatively arranged in said power device including a control member, a ring operatively arranged to be spaced from and surround said control member, and a spring between said power device and said ring to maintain said ring spaced from said control member and abutting said deformable member such that said ring may be moved to abut said control member to change the area of contact for said deformable member on said control member to automatically delay the changeover from a minimum feel proportion to a maximum feel proportion.

2. A force applying mechanism, comprising:

a fluid pressure operated motor having a pressure responsive unit therein;

a force applying member operatively connected with said pressure responsive unit effective for transmission of force from said pressure responsive unit and arranged to receive reaction force in proportion to the force exerted by the pressure responsive unit;

an operator-operated control member;

follow-up control valve mechanism actuated by the control member having a normal off position balancing pressure in said motor and being movable from said off position by actuation of said control member to establish differential pressure in said motor to move said pressure responsive unit thereby;

a coherent generally solid deformable force transmitting mass in a condition of controlled volumetric confinment between said force transmitting member and control member, said pressure responsive unit and said control member effective to transmit thereby reaction forces from said force applying member to said pressure responsive unit and to said control member in a [proportion] ratio, said force transmitting mass having a predetermined volume in the relaxed state of the mass such that said control member does not contact said mass until said control valve mechanism is moved from said off position; and pressure responsive means operatively connected to said pressure responsive unit, said pressure responsive means slidably receiving a stepped down projection of said control member and normally spaced from a shoulder on said control member and movable towards the shoulder to vary said [proportion] ratio of reaction forces applied to said pressure responsive unit and said control member as said pressure responsive unit strokes.

3. A force applying mechanism according to claim 2 wherein said pressure responsive means includes a spring biased ring operatively arranged to be spaced from and surround said control member and contact said control member when said force transmitting member has applied a reaction force to said mass that is greater than said spring.

4. A force applying mechanism, comprising:

a fluid pressure operated motor having a pressure responsive unit therein;

a force applying member operatively connected with said pressure responsive unit effective for transmission of force from said pressure responsive unit and arranged to receive reaction force in proportion to the force exerted by the pressure responsive unit;

an operator-operated control member;

follow-up control valve mechanism actuated by the control member having a normal off position balancing pressure in said motor and being movable from said off position by actuation of said control member to establish differential pressure in said motor to move said pressure responsive unit thereby;

a coherent generally solid deformable force transmitting mass in a condition of controlled volumetric confinement between said force transmitting member and control member, said pressure responsive unit and said control member effective to *proportionally* transmit thereby reaction forces from said force applying member to said pressure responsive unit and to said control member [in a proportion ratio], said force transmitting mass having a predetermined volume in the relaxed state of the mass such that said control member does not contact said mass until said control valve mechanism is moved from said off position; and pressure responsive means including a spring biased ring operatively arranged to be spaced from and surround said control member and contact said control member when said force transmitting member has applied a reaction force to said mass that is greater than said spring.

*5. For use with a servomotor mechanism having a power device, means controlling said device, force transmitting means operatively connected to said power device, said force transmitting means including a deformable member arranged for variable extrusion to proportionally vary the reaction on said means controlling said power device upon actuation of said power device, and a ring surrounding and receiving one end of said means controlling said power device and located in the path of movement of said means controlling said power device and engageable therewith on a given axial movement of said means controlling said power device, and spring means holding said ring in a position to transfer a portion of reaction forces from said force transmitting means into said power device, said spring means being collapsible upon a predetermined reaction force to cause said ring to engage said means controlling said power device whereupon a greater proportion of reaction forces are transmitted to said means controlling said power device.*

*6. For use with a servomotor mechanism having a power device, means controlling said power device, force transmitting means operatively connected to said power device, said force transmitting means including a confined deformable member arranged for variable extrusion to proportionally vary the reaction on said means controlling said power device upon actuation of said power device, and a ring surrounding and receiving one end of said means controlling said power device and located in the path of movement of said means controlling said power device and engageable therewith on a given axial movement of said means controlilng said power device, and spring means for regulating the position of said ring with respect to said means controlling said power device to permit a change in area for said deformable member in its extrusion to increase the proportion of reaction on said means controlling said power device.*

*7. For use with a servomotor mechanism having a power device, means controlling said power device, force transmitting means operatively connected to said power device, said force transmitting means including a deformable member arranged for variable extrusion to proportionally vary the reaction on said means controlling said power device upon actuation of said power device, and pressure responsive means operatively connected to said power device, said pressure responsive means slidably and internally receiving a stepped down projection of said means controlling said power device and normally spaced from a shoulder on said means controlling said power device and movable towards the shoulder to vary the ratio of reaction forces on said means controlling said power device as said power device strokes.*

References Cited

The following references, cited by the Examiner, are of record in the patented file of this patent or the original patent.

UNITED STATES PATENTS

| | | | |
|---|---|---|---|
| 3,143,926 | 8/1964 | Stelzer | 91—376 |
| 3,023,053 | 2/1962 | Hager | 91—369 |
| 3,091,255 | 5/1963 | Wahlstrom | 91—369 |
| 3,149,539 | 9/1964 | Prather | 91—369 |
| 3,110,031 | 11/1963 | Price | 91—369 |

PAUL E. MASLOUSKY, *Primary Examiner.*